United States Patent [19]

Bryant

[11] Patent Number: 4,600,868
[45] Date of Patent: Jul. 15, 1986

[54] OPEN LOOP ACCELERATION/DECELERATION CONTROL FOR DISK DRIVE STEPPER MOTORS

[76] Inventor: Lawrence M. Bryant, 1668 Flickinger Ave., San Jose, Calif. 95131

[21] Appl. No.: 493,131

[22] Filed: May 9, 1983

[51] Int. Cl.⁴ .............................................. G05B 19/10
[52] U.S. Cl. .................................... 318/567; 318/561; 318/696; 360/78
[58] Field of Search ............................ 360/78, 75, 77; 318/696, 561, 567, 685

[56] References Cited

U.S. PATENT DOCUMENTS

| | | | |
|---|---|---|---|
| 3,972,535 | 8/1976 | Bleiman | 318/696 X |
| 4,087,732 | 5/1978 | Pritchard | 318/696 |
| 4,161,004 | 7/1979 | Dalziel | 360/106 |
| 4,340,840 | 7/1982 | Hanagata | 318/561 |
| 4,383,209 | 5/1983 | Lewis | 318/696 |
| 4,387,328 | 6/1983 | Presley | 318/696 |
| 4,429,268 | 1/1984 | Yajima | 318/696 |
| 4,439,800 | 3/1984 | Powell | 318/561 X |
| 4,467,254 | 8/1984 | Zucco | 318/696 |
| 4,468,601 | 8/1984 | Chamran | 318/696 X |
| 4,476,421 | 10/1984 | Moriguchi | 318/696 |

OTHER PUBLICATIONS

Kordik, Kenneth S., "Reducing Overshoot and Oscillation in Variable Reluctance Step Motors," Proceedings, Ninth Annual Symposium on Incremental Motion Control Systems and Devices, University of Illinois, Jun. 2–5, 1980, pp. 65–78.
Charles K. Taft, William Banister, & Edwin Slate, "Pulse-Width Modulation Control of DC Motors," University of New Hampshire, place published unknown, date published unknown but prior to May 9, 1983.

Primary Examiner—Bernard Roskoski
Assistant Examiner—Patrick C. Keane

[57] ABSTRACT

An open loop controller for the stepper motor of a disk drive actuator is programmed to supply pulse width modulated drive voltages for energizing and de-energizing successive phases of the stepper motor at controlled rates during the initial and final phases of each actuator seek, thereby controlling the acceleration and deceleration profiles of the actuator to reduce its mid-frequency resonance, settling time and position hysterysis.

11 Claims, 8 Drawing Figures

| STEP | PHASES | | | |
|---|---|---|---|---|
| | A | B | C | D |
| 1 | 1 | 0 | 0 | 1 |
| 2 | 1 | 1 | 0 | 0 |
| 3 | 0 | 1 | 1 | 0 |
| 4 | 0 | 0 | 1 | 1 |
| 1 | 1 | 0 | 0 | 1 |

OPEN LOOP ACCELERATION/DECELERATION CONTROL FOR DISK DRIVE STEPPER MOTORS

FIELD OF THE INVENTION

This invention relates to stepper motor powered actuators for rotating memories and, more particularly, to open loop techniques for controlling the acceleration/deceleration profiles of such actuators.

BACKGROUND OF THE INVENTION

Open loop driven stepper motors are commonly used to power the actuators of low cost disk drives. They are relatively inexpensive, and they offer sufficient positioning accuracy and repeatability to satisfy the requirements of most floppy disk drives and even some Winchester disk drives. For example, such stepper motors have been successfully employed in disk drives to power band drive actuators of the type described in U.S. Pat. No. 4,161,004, which issued July 10, 1979 on a "Head Positioning Mechanism for Recording/Playback Machine." More particularly, the Shugart SA850 disk drive is an example of a floppy disk drive which has an open loop stepper motor for operating the linear band drive actuator described in that patent, while the Shugart SA4000 is an example of a Winchester disk drive which has an open loop stepper motor for operating the rotary band drive actuator described in that patent.

It is well understood that stepper motors inherently are substantially under damped systems. Stopping torque is developed internally of such a motor only after the rotor of the motor has rotated beyond its stable detent or step position. Thus, the rotor tends to overshoot and oscillate about the desired step position at a so-called "natural frequency", thereby prolonging the motor settling time. Stepper motors also have a tendency to exhibit unwanted "mid-frequency" resonance which retards their acceleration.

Effective damping is the key to controlling the natural resonance and the mid-frequency resonance of a stepper motor. Accordingly, substantial effect and expense have been devoted to the development of open and closed loop damping systems for such motors. Closed loop damping systems are beyond the scope of the present invention, but it is noted that some designers have turned to those more costly systems for damping the actuators of so-called low cost disk drives in an attempt to meet the challenge of the shortened seek/settle times which are being specified for modern disk drives. As a matter of definition, "seek time" is used hereinbelow to refer to (1) the time that is required for the read/write head of a disk drive to move to a selected data track, plus (2) the time that is required for the head to settle on that track. However, others might prefer to call the sum of those two time periods the seek/settle time as hereinabove.

For most disk drive applications, single track seek time is a critically important factor only if it exceeds the so-called latency time (i.e., the time required for the disk to make a complete revolution). If the single track seek time is shorter than the latency time, the latency period determines the average single track data access time of the disk drive, which is the parameter that is usually of interest to the user.

As will be appreciated, single track seek time is the shortest relevant seek time of a disk drive. However, even the seemingly unambitious goal of ensuring that the single track seek time is less than the latency period has been difficult to achieve while using an open loop stepper motor for the actuator, even though proposals have been made to reduce the step rate as the actuator completes its seek and to mechanically damp the stepper motor, such as with a viscous damper as in the Shugart SA1000 disk drive or with a frictional retard mechanism as in the aforementioned patent. Viscous dampers have been favored for mechanical damping because of their relatively straightforward first order damping characteristics, but they are relatively complex to manufacture and are a potential source of unwanted contaminants, especially in a Winchester disk drive environment where cleanliness is critical. For a more comprehensive discussion of the prior art, see Kordik, Kenneth S., "Reducing Overshoot and Oscillation in Variable Reluctance Step Motors," *Proceedings, Ninth Annual Symposium on Incremental Motion Control Systems and Devices*, University of Illinois, June 2-5, 1980, pp. 65-78.

SUMMARY OF THE INVENTION

In accordance with the present invention, there is a relatively inexpensive, but efficient open loop, pulse width modulation technique for controlling the acceleration and deceleration profile of a stepper motor driven actuator for a disk drive. Pulse width modulation routines are invoked under program control for single track seeks and for the first two and the last two steps of multi-track seeks, so that the settling time, positional hysterysis, and mid-frequency resonance of the actuator assembly are optimized. Different routines are provided for single and multi-track seeks because (1) mid-frequency resonance is not at issue on single track seeks, (2) the maximum allowable step rate or speed of the stepper motor is different for single track and multi-track seeks, and (3) the optimal acceleration/deceleration characteristics are different for single track and multi-track seeks. Typically, the pulse width modulation routines are microcoded into a look up table within a microprocessor and are invoked under the control of a counter which is incremented to count the number of steps commanded for each seek.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to a certain embodiment, it is to be understood that there is no intent to limit it to that embodiment. On the contrary, the aim is to cover all modifications, alternatives and equivalents falling within the spirit and scope of the invention as defined by the appended claims.

Figure 1:
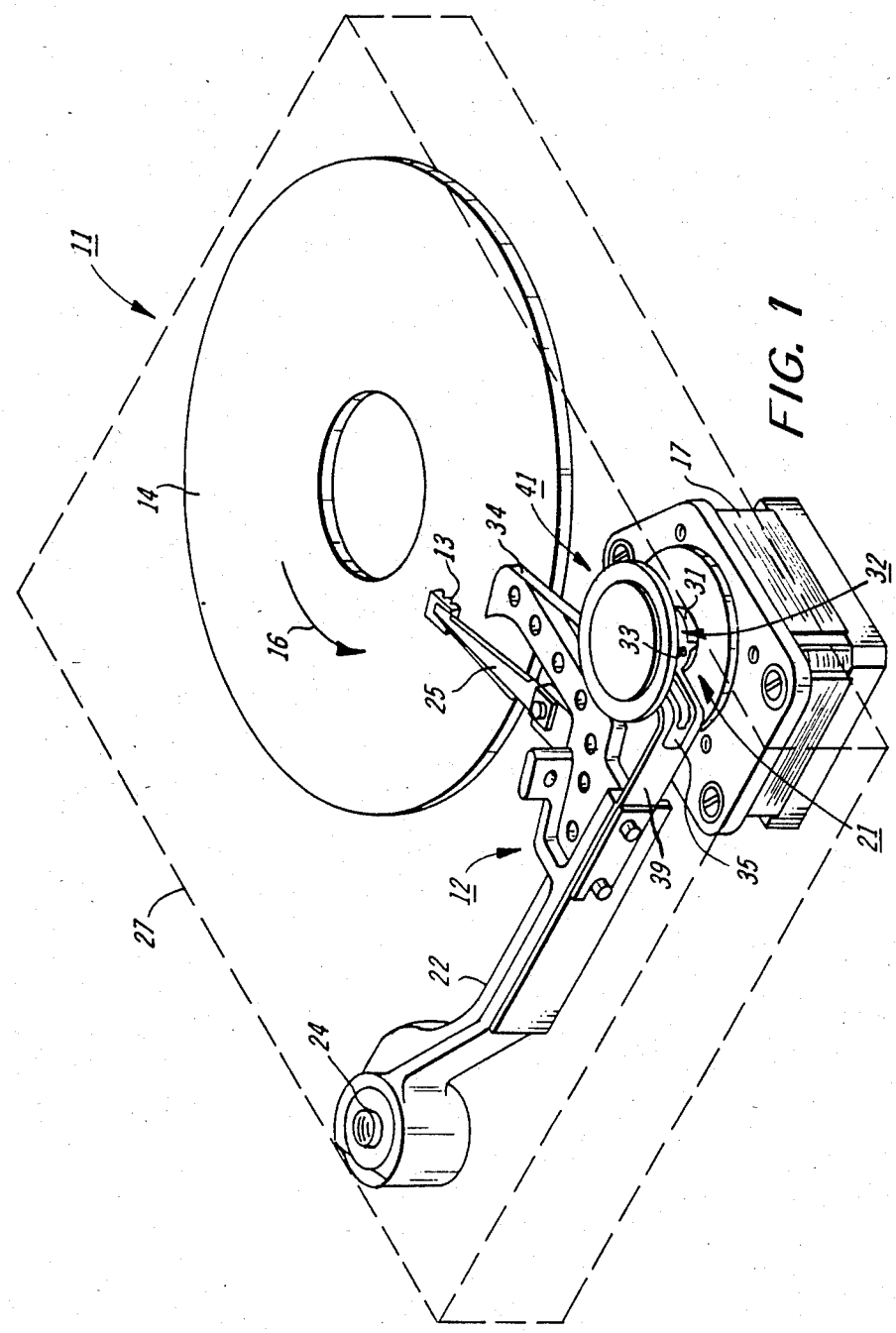
FIG. 1 is a simplified isometric view of a disk drive having a stepper motor controlled band drive actuator.

Turning now to the drawings, and at this point especially to FIG. 1, there is a disk drive 11 (shown only in relevant part) having an actuator assembly 12 for aligning a read/write head 13 with a selected data track on a disk-like recording media 14. The recording media 14 is centrally mounted on a spindle (not shown) for rotation during operation in the direction of the arrow 16. The actuator assembly 12 is, in turn, driven by a stepper motor 17 to position the read/write head 13 in response to a "seek" command, so that data may be written on or read from any one of a plurality of concentric data tracks on the recording media 14.

As illustrated, the recording media 14 is a rigid magnetic recording disk or platter for, say, a Winchester-type drive. However it will be evident that the broader aspects of this invention may be applied to other types of disk drives, such as floppy or flexible disk drives. Moreover, while only one read/write head 13 is shown, it will be understood that the actuator assembly 12 could be configured to support a plurality of such heads for multiple surface recording on one or more disks.

Figure 2:
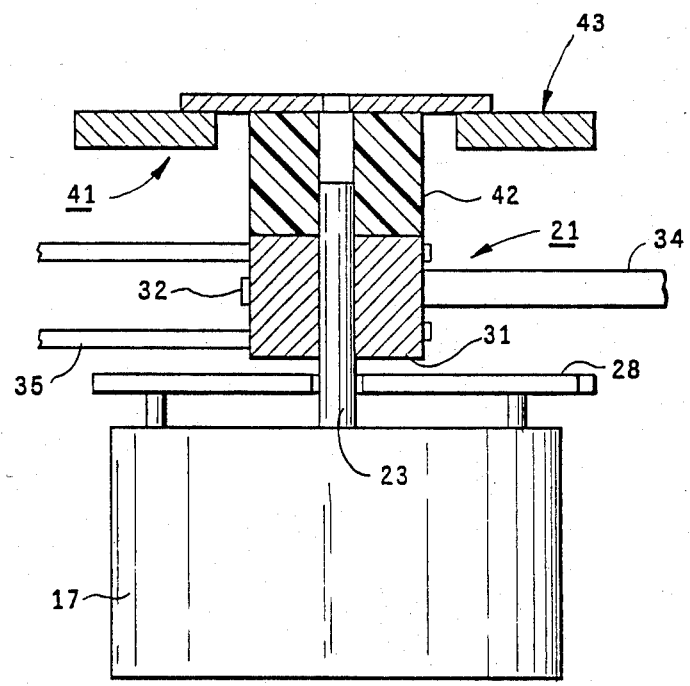
FIG. 2 is an enlarged, partially schematic, sectional view of the band drive actuator shown in FIG. 1.

In keeping with accepted practices, the actuator assembly 12 comprises a band drive 21 for coupling an actuator arm 22 to the output or drive shaft 23 (FIG. 2) of the motor 17. As illustrated, one end of the actuator arm 22 is mounted through a suitable bearing (not shown) for rotation on a stationary shaft 24, and the read/write head 13 is supported by a more or less conventional cantilever-like flexure 25 which is secured (by means not shown) to the actuator arm 22 at a predetermined distance from the axis of the shaft 24 (i.e., the axis of rotation of the arm 22). Accordingly, the actuator assembly 12 is a so-called "rotary actuator" because the band drive 21 causes the actuator arm 22 to rotate on the shaft 24 in response to the incremental or step-like rotation of the motor drive shaft 23. Nevertheless, it will be apparent that the present invention could also be applied to "linear" band drive actuators.

As is known, in a Winchester-type disk drive, the configuration of the read/write head 13, the load applied thereto, and the flexure 25 are carefully selected so that the head 13 "flies" during operation on an air bearing at a predetermined, microscopic distance from the surface of the disk 14. Therefore, in such a disk drive, the actuator assembly 12 and the disk 14 are hermetically sealed in an air filtered housing or enclosure, generally indicated by the dashed lines 27, thereby reducing the risk of potentially harmful contaminants intervening between the head 13 and the disk 14. The stepper motor 17 typically is outside the sealed enclosure, but its flange 28 may be within the enclosure.

To rotate the actuator arm 22 under the control of the stepper motor 117, the band drive 21 comprises a capstan 31 which is pinned or otherwise secured to the motor drive shaft 23, and a substantially non-extensible band 32 which is attached to the capstan 31 and to the actuator arm 22. More particularly, the band 32 is secured to the capstan 31, as at 33, and is wrapped therearound so that its opposing segments 34 and 35 cross as they extend from the capstan 31 to connect to spaced apart points on the actuator arm 22. Consequently, when the motor 17 rotates the capstan 31 in, say, a clockwise direction, the right hand segment 34 of the band 32 feeds off the capstan 31 while the left hand segment 35 is being taken up by the capstan 31, thereby causing counterclockwise rotation of the actuator arm 22 so that the read/write head 13 moves toward the center of the disk 14. As will be appreciated, precisely the opposite action takes place when the capstan 31 is rotated in the opposite or counterclockwise direction to move the head 13 toward the outer edge of the disk 14. Preferably, the two segments 34 and 35 of the band 32 are of approximately equal length and of substantially different widths, so that the wider segment 35 may be split to allow the narrower segment 34 to be threaded therethrough. In that event, the diameter of the capstan 31 is selected so that less than one complete capstan revolution is sufficient to move the read/write head 13 from the outermost to the innermost track on the disk 14, or vice-versa. To avoid unwanted backlash, a cantilever leaf spring 39 or the like is connected between the actuator arm 22 and one of the segments, say the segment 35, of the band 32, thereby applying a substantially constant tension to the band 32.

As described in more detail in a copending and commonly assigned United States patent application, which was filed May 9, 1983 under Ser. No. 493,132 on a "Mechanical Damper for Disk Drives Having Band Drive Actuators" there advantageously is a damper 41 comprising an energy absorbing elastomeric member 42 for coupling a predetermined inertial mass 43 to the capstan 31 of the band drive 21. The damper 41 is symmetrical about the axis of rotation of the capstan 31 so that the band drive 21 is balanced. As will be appreciated, an important advantage of the damper 41 is that its solid state (i.e., fluid free) construction enables it be mounted within the sealed enclosure 27 (FIG. 1) of a Winchester disk drive with little, if any risk, that it will ever become a source of unwanted contaminants.

Figures 3, 4:
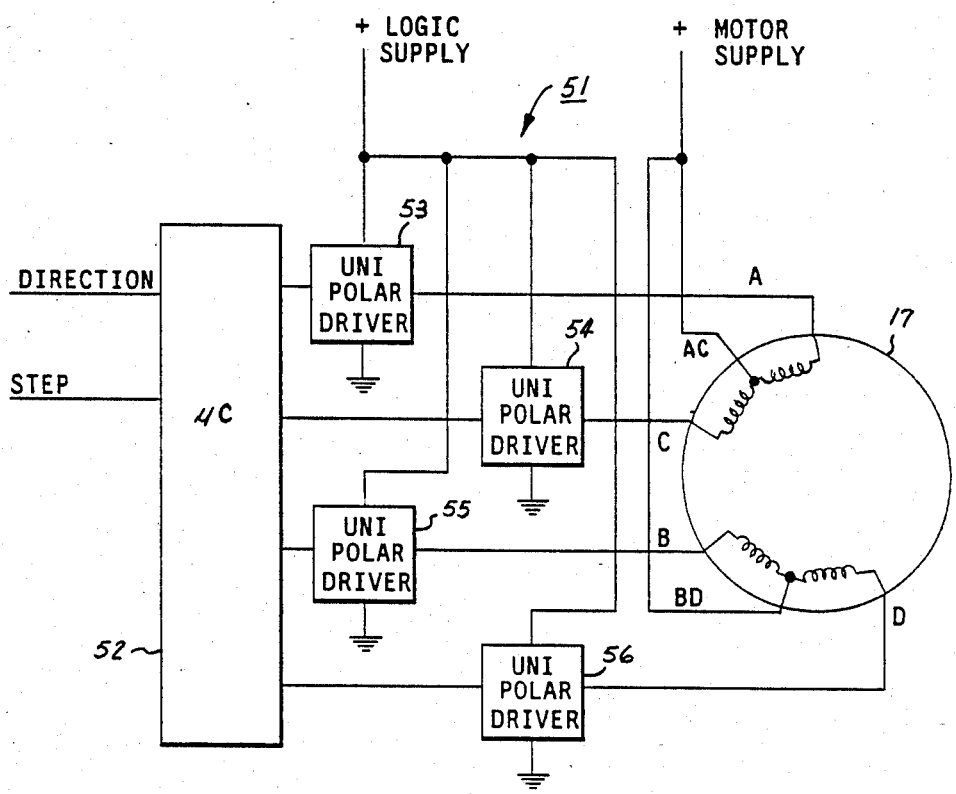
FIG. 3 is a basic block diagram of a unipolar circuit for providing pulse width modulation control for the stepper motor shown in FIG. 1 in accordance with the present invention.
FIG. 4 is a table illustrating a two-phase-on switching sequence for the stepper motor phases

Referring to FIG. 3, there is a microprocessor controlled unipolar controller 51 for energizing the stepper motor 17 to execute seek commands furnished by a disk controller (not shown). Such seek commands are usually represented by one or more step pulses which indicate the number of tracks the read/write head 13 (FIG. 1) is to be moved and by a binary (high or low logic level) directional signal which indicates the direction in which the read/write head 13 is to be moved. The controller 51 comprises a microprocessor 52 for actuating unipolar drives 53–56 in response to the "step" and "direction" signals received from the disk controller, so that the windings or phases A–D of the stepper motor 17 are energized in properly timed sequence to execute the seek command.

More particularly, to accomodate the unipolar design of the controller 51, the stepper motor 17 preferably is a permanent magnet motor with bifilar windings. In that event, the coils for the A and C phases are wound on, say, the even numbered stator poles (not shown) of the motor 17, while the coils for the B and D phases are wound on the other or odd numbered stator poles. Advantageously, a two-phase-on, or overlapping drive, is provided for the stepper motor 17 to reduce its resonance, improve its single-step damping, and improve its step accuracy. Thus the detent positions for the rotor (not shown) of the stepper motor 17 are between adjacent stator poles. Furthermore, as illustrated in FIG. 4, the motor phases A–D are energized in an AD, AB, BC, CD, AD sequence for clockwise rotation of the capstan 31 (as viewed in FIG. 1) and in an AD, CD, BC, AB, AD sequence for counterclockwise rotation of the capstan 31.

Figure 5:
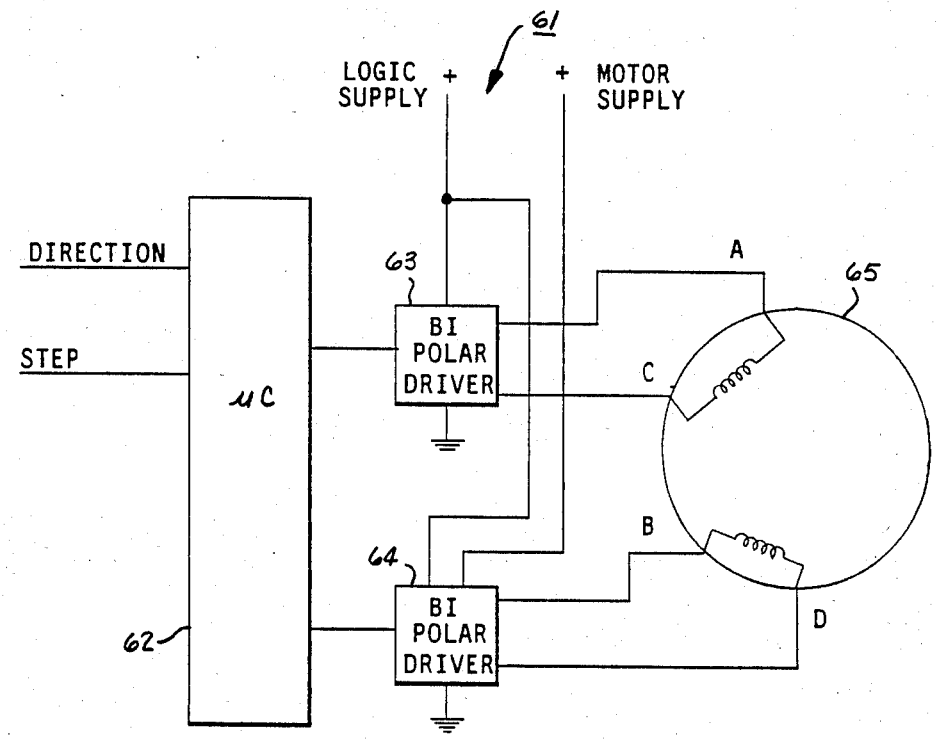
FIG. 5 is a basic block diagram of a bipolar alternative to the stepper motor control circuit of FIG. 3.

While a preferred stepper motor configuration and controller have been described, it should be understood that this invention is not dependent on those details. For example, as illustrated in FIG. 5, the invention may also be employed with disk drives utilizing stepper motors with bipolar controllers. As will be seen, the bipolar controller 61 includes a microprocessor 62 for actuating bipolar drivers 63 and 64 in response to the "step" and "direction" signals (i.e., the "seek commands") received from a disk controller, so that the windings or phases A–D of the stepper motor 65 are energized in properly timed sequence to execute the seek command. The invention will be described in the context of the embodiment depicted in FIGS. 1–4, but it will be evident that there are a variety of alternatives and equivalents.

Focusing on the controller 51 of FIG. 3, the microprocessor 52 discriminates between single and multiple track seeks by counting the step pulses associated with a seek command. Buffered and unbuffered seek commands are readily accomodated by having each step pulse reset a timer (not shown) within the microprocessor 52 so that step pulses continue to be accumulated by the counter (also not shown) until a predetermined time out period expires without any further step pulses being received. Typically, the time out period is selected to be about two hundred microseconds long, but that is a system dependent parameter which may be altered as required.

Figure 6A:
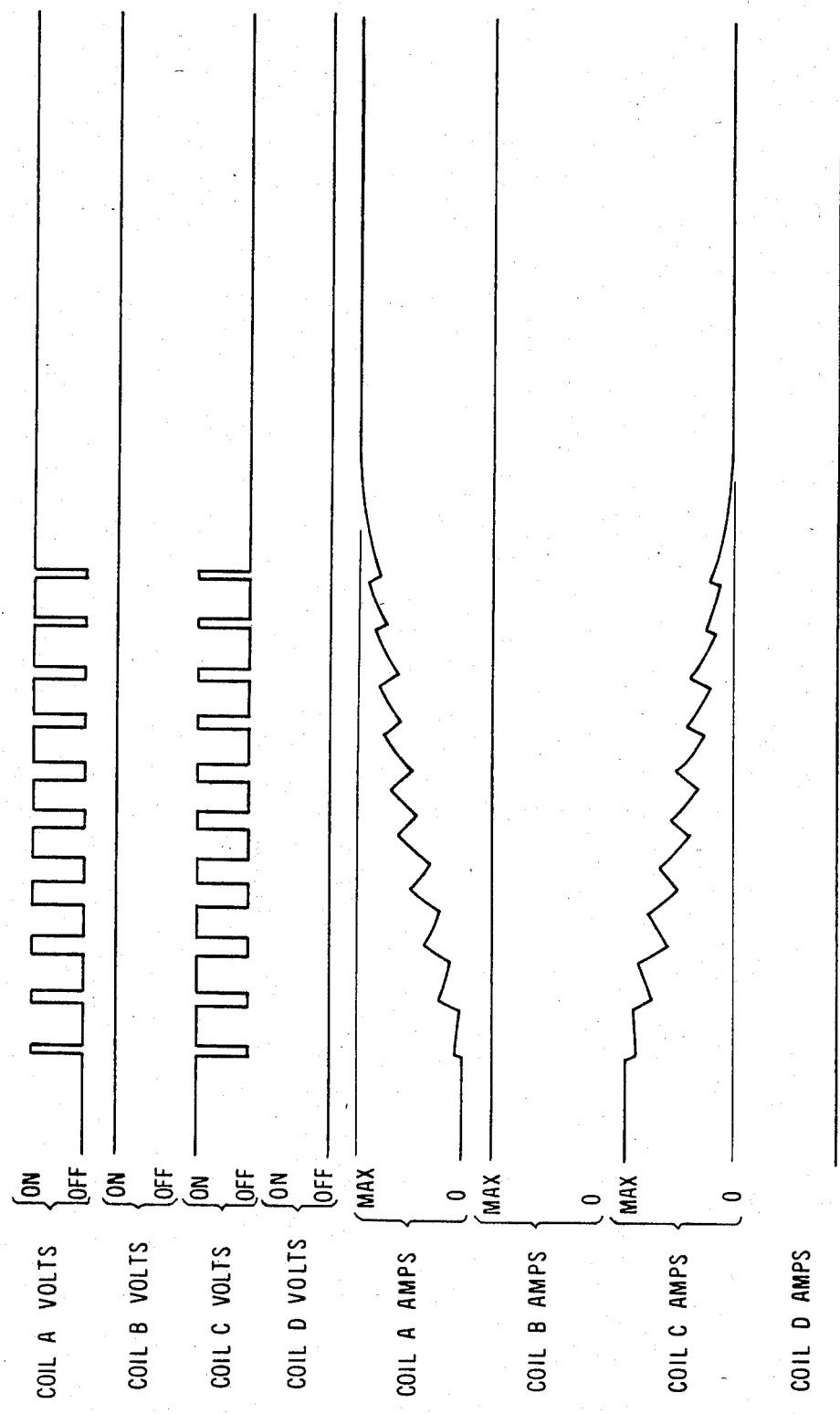
FIG. 6 is a timing diagram illustrating a typical response of the stepper motor to the pulse width modulation control that is provided for single track seeks in keeping with one aspect of this invention.
Figure 6B:
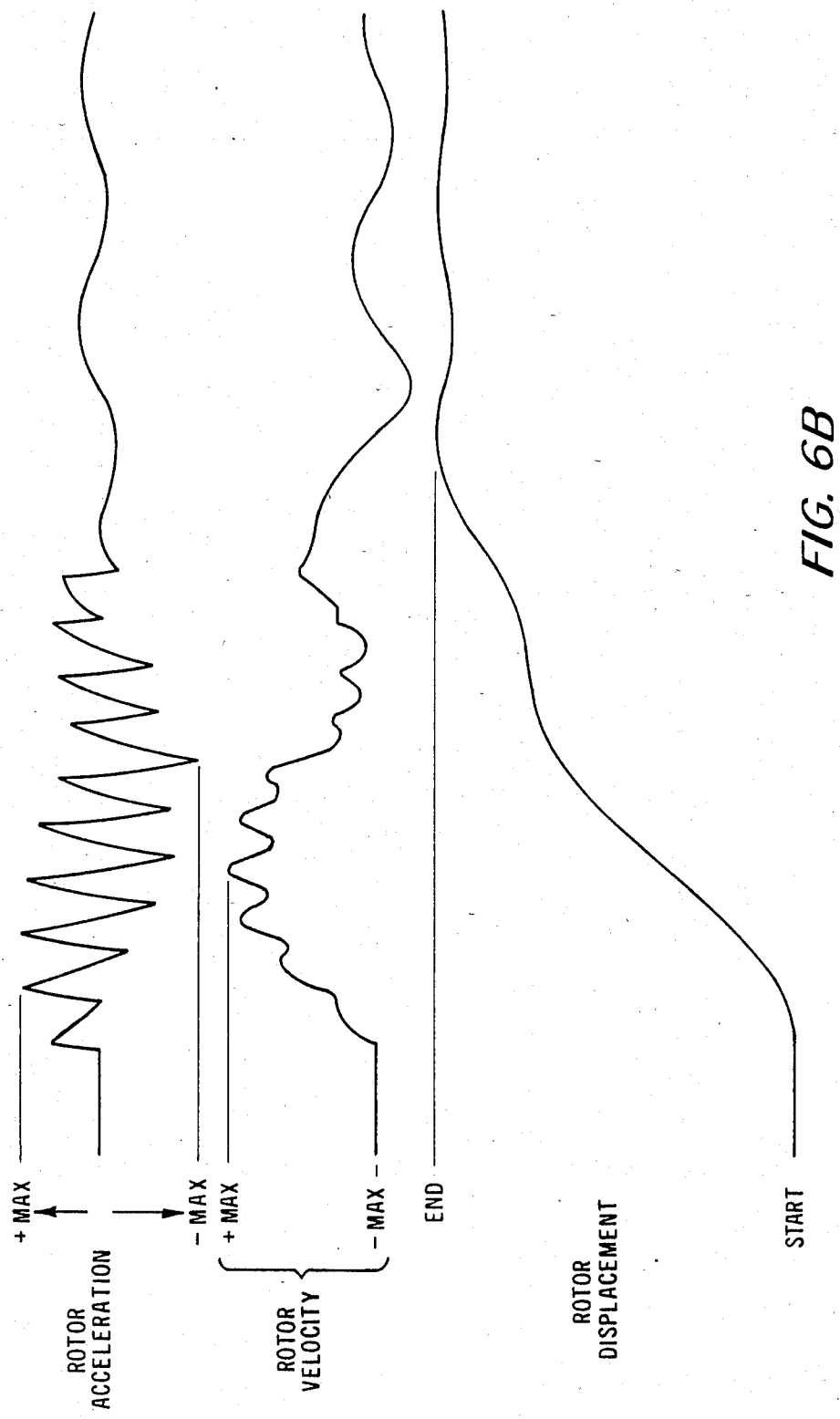

If a seek command comprising just one step pulse is applied to the microprocessor 52, a "single track" seek routine is invoked by the microprocessor 52, whereby energy is gradually transferred at a varying rate from one phase to another of the stepper motor 17 in correct sequence for a single step, with the rate variation being selected to minimize the position hysterysis and the settling time of the actuator assembly 12 (FIG. 1), including the stepper motor 17. As may be confirmed by reference to FIG. 4, no matter where the stepper motor 17 happens to be in its stepping sequence, the next step in the sequence occurs when energy is transferred from one phase to a complementarily driven phase. Thus, as shown in FIG. 6, the rate at which energy is transferred from one phase to the next is easily controlled by programming the microprocessor 52 to switch the drivers for those phases, so that complementary bursts of width modulated pulses of predetermined frequency or repetition rate are superimposed on the drive voltages for such phases. For example, if the next step of the stepper motor 17 requires deenergization of phase C and energization of phase A, the microprocessor 52 applies complementary bursts of width modulated switching pulses to the drivers 53 and 54 (FIG. 3), thereby providing complementary bursts of width modulated drive voltages for phases A and C. Thus, it will be seen that the rate at which energy is transferred from one phase to the next is governed by the burst length of the pulse trains and the width modulation of the pulses. As will be appreciated, the advantage of selecting a predetermined pattern for the pulses is that the timing can then be controlled by the internal clock (not shown) of the microprocessor 52.

Figure 7A:
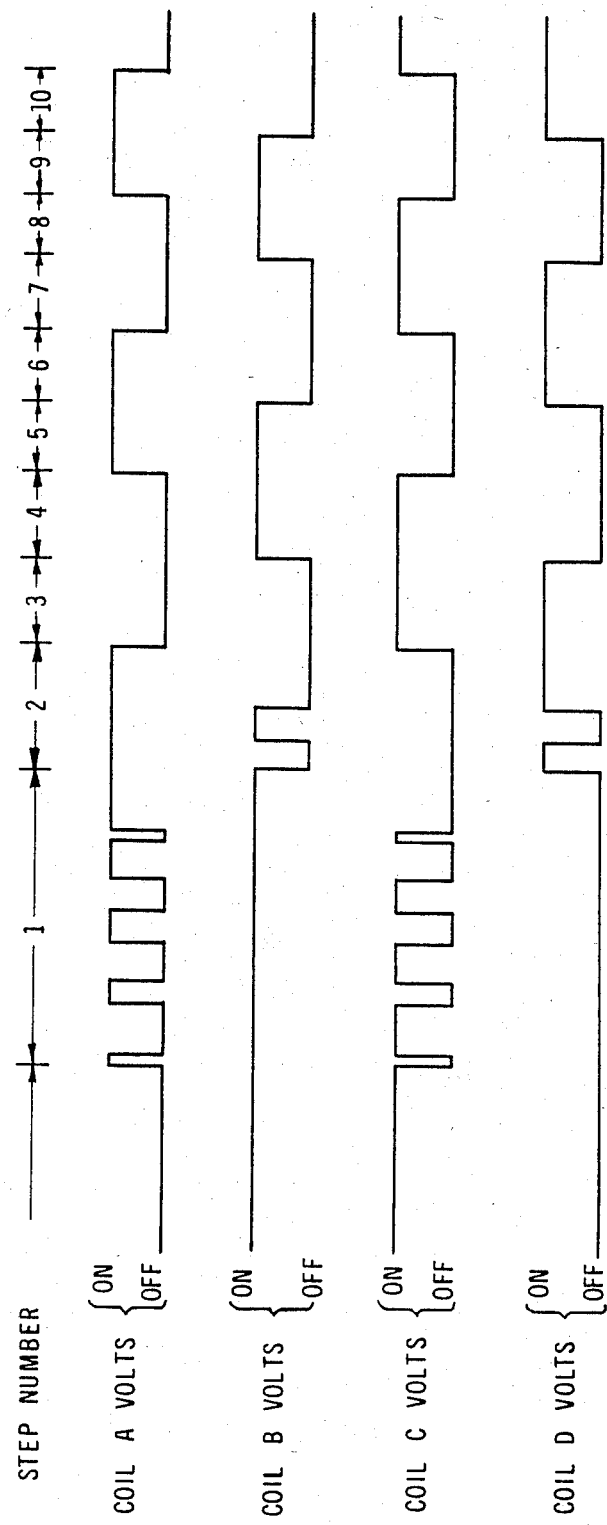
FIG. 7 is a timing diagram illustrating a typical response of the stepper motor to the pulse width modulation control that is provided in keeping with another aspect of the invention for acceleration control during multi-track seeks.
Figure 7B:
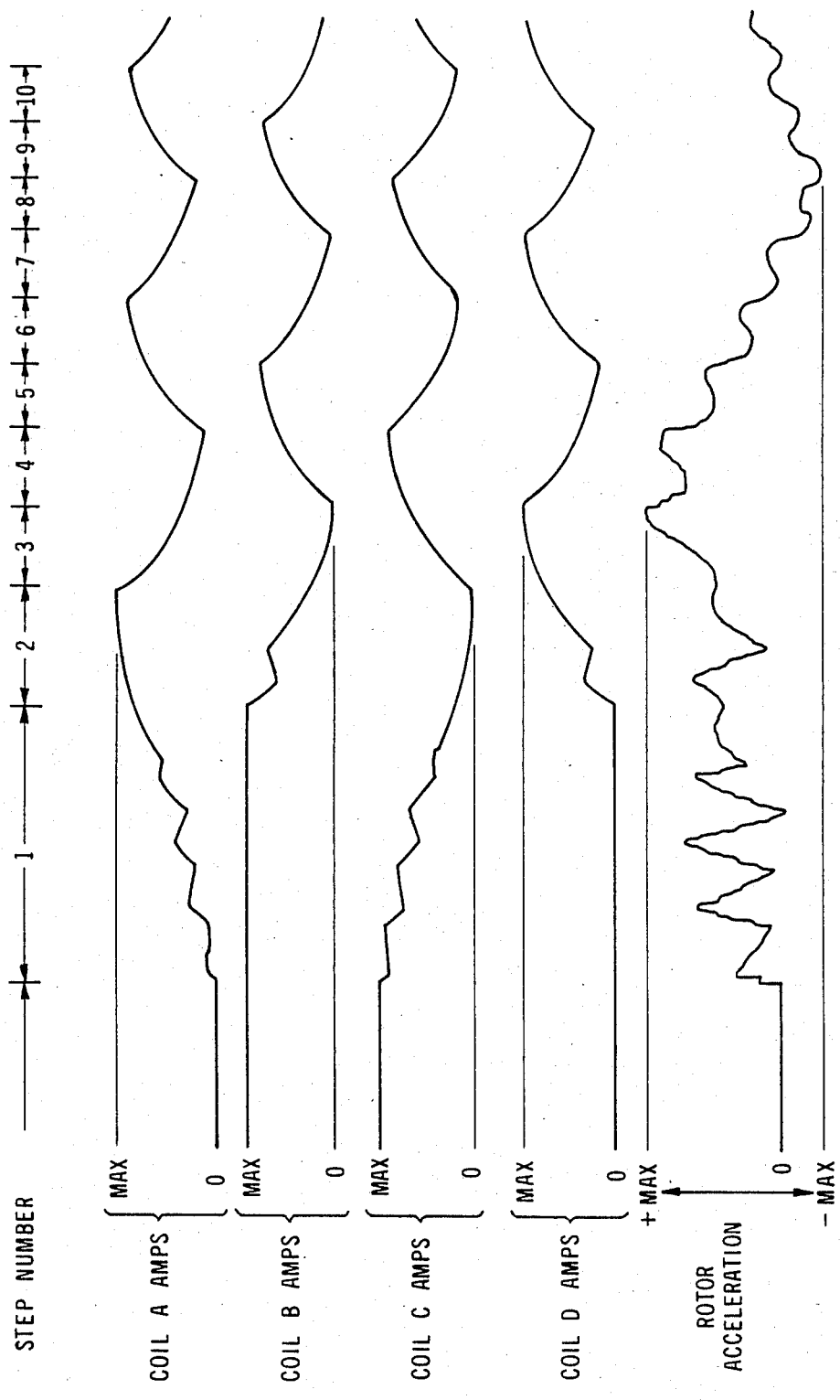
Figure 7C:
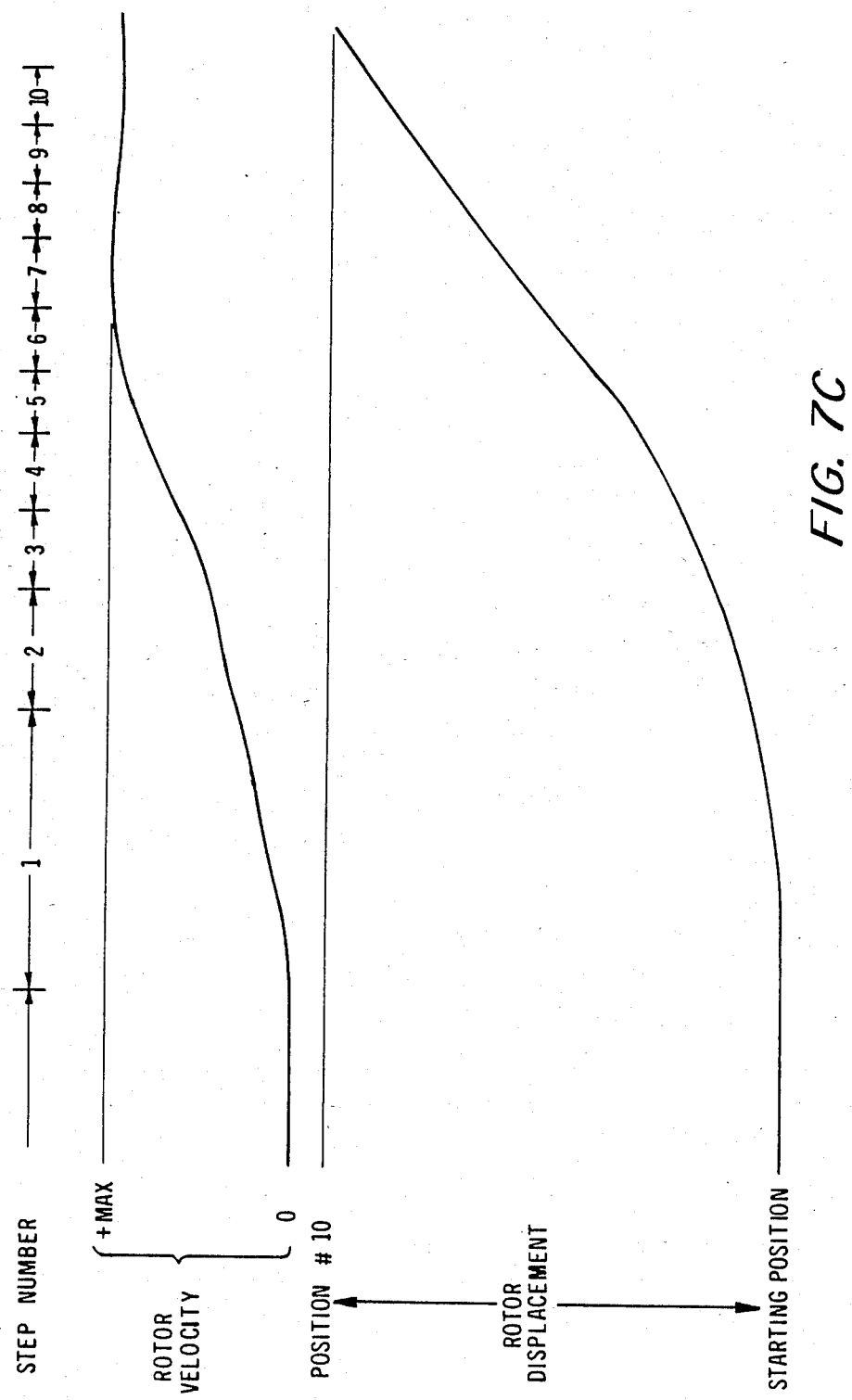
Figure 8A:
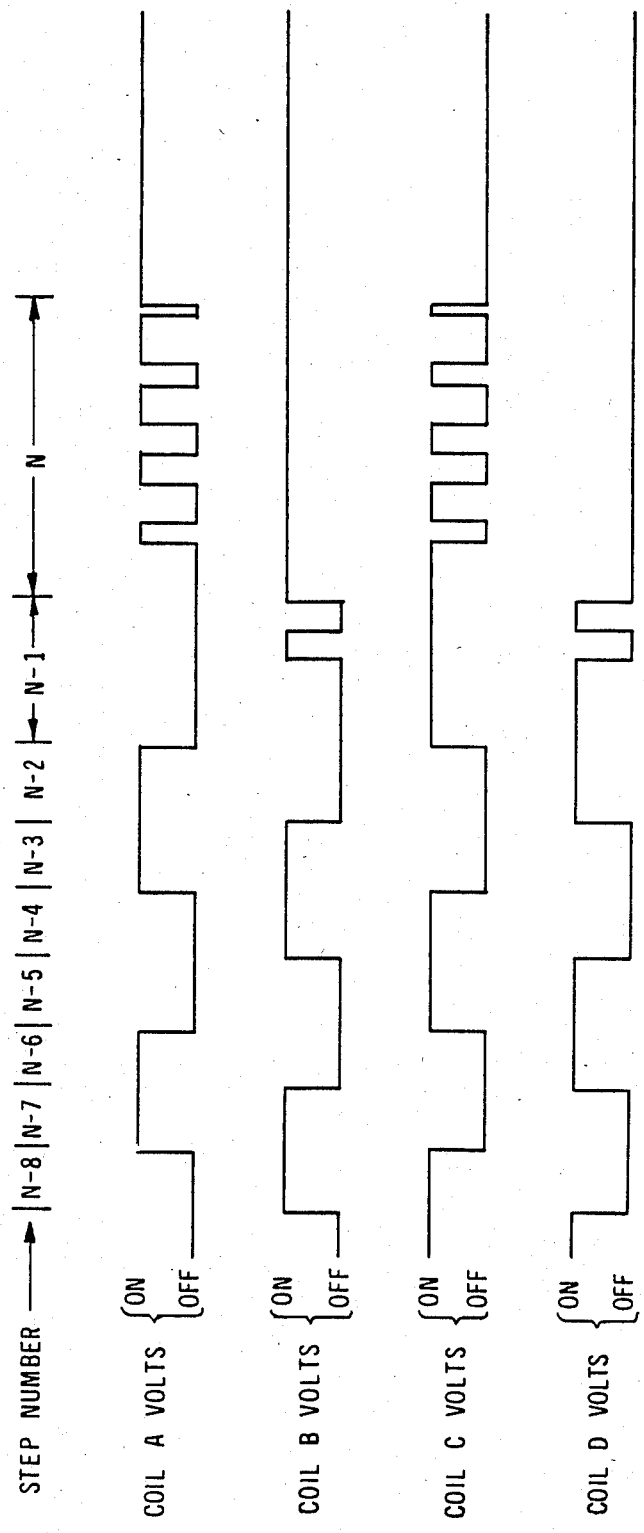
FIG. 8 is a timing diagram illustrating typical response of the stepper motor to the pulse width modulation control that is provided in keeping with another aspect of this invention for deceleration control during multi-track seeks.
Figure 8B:
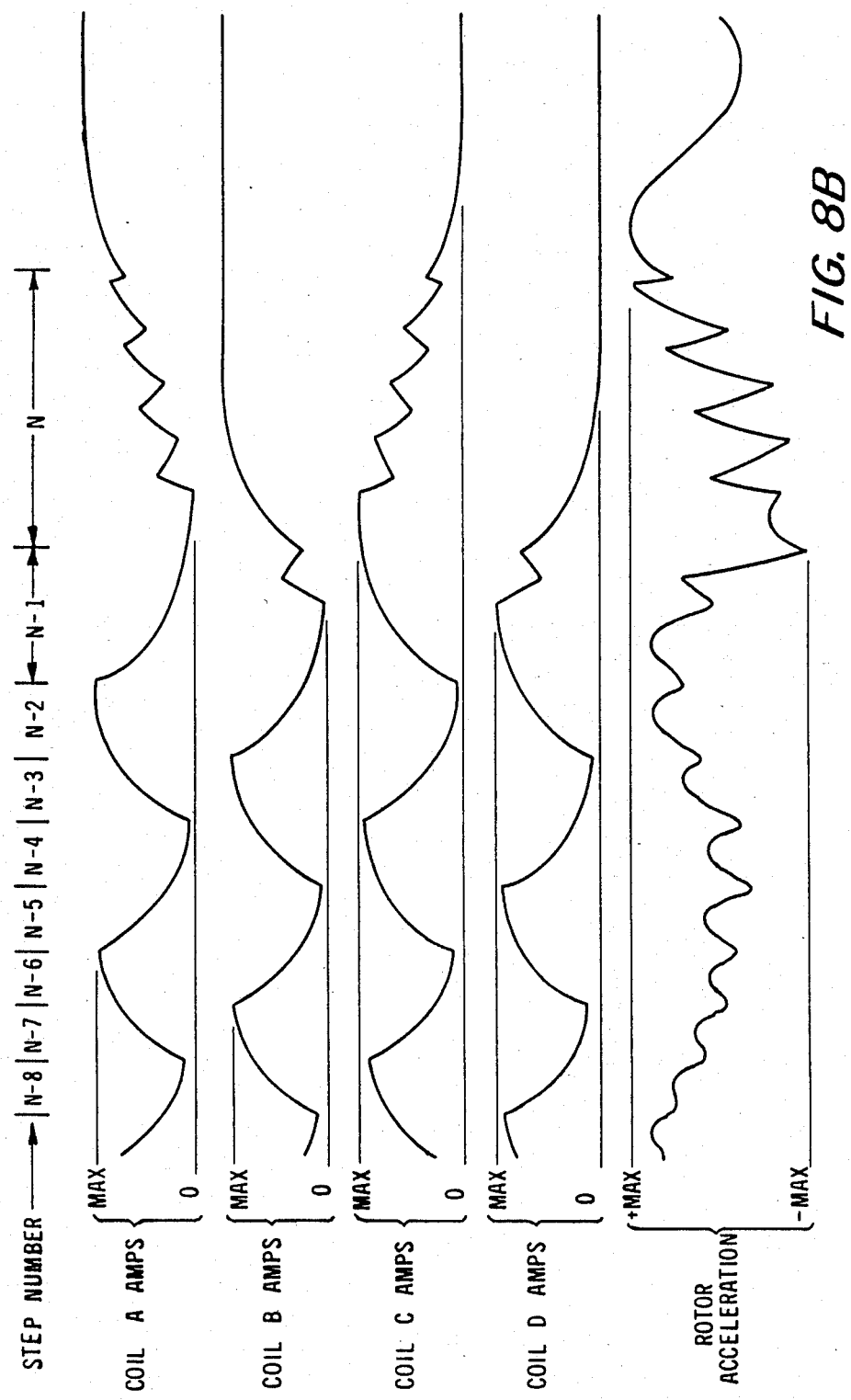
Figure 8C:
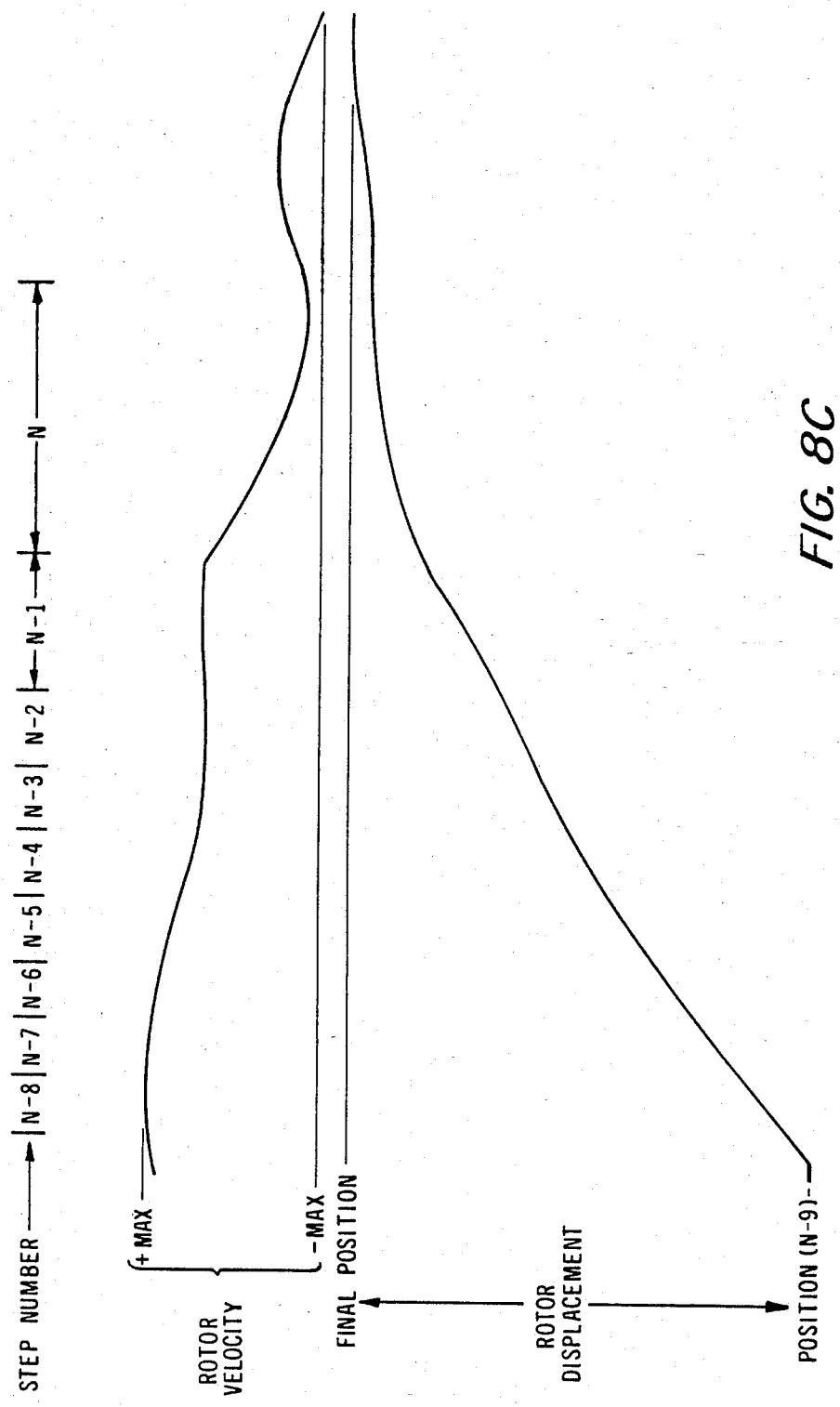

A similar, but somewhat more complicated routine is invoked by the microprocessor 52 in response to a seek command comprising a plurality of step pulses (i.e., a multi-track seek command). To perform a multi-track seek routine, the microprocessor 52 supplies bursts of complementarily width modulated switching pulses for the drivers 53–56 to control the rate at which energy is transferred from phase-to-phase of the stepper motor 17 during the first few and the last few steps of the seek. For example, as shown in FIGS. 7 and 8, the rate at which energy is transferred is typically controlled by the microprocessor 52 during the first two and the last two steps of the seek. The acceleration control phase of the multi-track seek routine is selected to minimize the mid-frequency resonance that is experienced as the stepper motor 17 accelerates toward its maximum slew rate, and the deceleration control phase of the routine is selected to minimize the settling time and the position hysterysis of the actuator assembly 12 at the conclusion of a maximum slew rate seek. To avoid ambiguity in the routine, the deceleration control phase (FIG. 8) is dominant over the acceleration control phase (i.e., the acceleration control pulses (FIG. 7) are suppressed in whole or in part for multi-track seeks of less than four tracks in the case of the above example).

CONCLUSION

In view of the foregoing, it will be understood that the present invention provides a relatively efficient and inexpensive open loop controller for minimizing, or at least reducing, the mid-frequency resonance, the settling time and the position hysterysis of stepper motor driven disk drive actuators. To accomplish that, the controller is programmed to supply preselected bursts of width modulated pulses for controlling the acceleration and deceleration profiles of such an actuator.

What is claimed is:

1. In a disk drive having an actuator for aligning a read/write head with a selected data track, and a unipolar stepper motor for driving said actuator in response to seek commands identifying the direction and number of steps said actuator is to be moved to complete respective seeks;

the improvement comprising an open loop programmed controller for energizing and deenergizing selected phases of said stepper motor in proper sequence to execute said seeks, said controller being programmed to apply predetermined length bursts of width modulated complementary drive voltage pulses to the phases of said motor which are energized and de-energized as said seek is being initiated and completed, whereby the acceleration and deceleration profiles of said actuator are controlled.

2. The improvement of claim 1 wherein said drive voltage pulses have a predetermined pattern.

3. The improvement of claim 1 wherein said controller distinguishes between single and multi-track seeks and is programmed to apply a first set of width modulated complementary drive voltage pulses to the selected phases of said motor for a single track seek and a second set of width modulated complementary drive voltage pulses to the selected phases of said motor for a multi-track seek, whereby the acceleration and deceleration profiles of said actuator are independently optimized for single and multi-track seeks.

4. The improvement of claim 2 wherein
said first set of pulses is selected to provide reduced settling time and reduced position hysterysis for said actuator during single track seeks, and
said second set of pulses is selected to provide reduced mid-frequency resonance, reduced settling time, and reduced position hysterysis for said actuator during multi-track seeks.

5. The improvement of claim 4 wherein
said first set of pulses is a single, finite length burst of width modulated, complementary drive voltage pulses for the selected phases of said motor, and
said second set of pulses comprises first and second finite length bursts of width modulated, complementary drive voltage pulses for the selected phases of said motor; said first burst of pulses being selected to control the acceleration profile of said actuator, and said second burst of pulses being selected to control the deceleration profile of said actuator.

6. The improvement of claim 5 wherein
said first burst of pulses and said second burst of pulses are applied to the selected phases of said motor during a first few steps and a final few steps, respectively, of multi-track seeks exceeding a predetermined number of tracks.

7. In a disk drive having an actuator for aligning a read/write head with a selected data track, and a bipolar stepper motor for driving said actuator in response to seek commands identifying the direction and number of steps said actuator is to be moved to complete respective seeks;
the improvement comprising an open loop programmed controller for reversing the energization of selected phases of said stepper motor in proper sequence to execute said seeks,
said controller being programmed to apply predetermined length bursts of width modulated drive voltage pulses to said selected phases of said motor while said seek is being initiated and completed, whereby the acceleration and deceleration profiles of said actuator are controlled.

8. The improvement of claim 7 wherein said controller distinguishes between single and multi-track seeks and is programmed to apply a first set of width modulated drive voltage pulses to the selected phases of said motor for a single track seek and a second set of width modulated drive voltage pulses to the selected phases of said motor for a multi-track seek, whereby the acceleration and deceleration profiles of said actuator are independently optimized for single and multi-track seeks.

9. The improvement of claim 8 wherein
said first set of pulses is selected to provide reduced settling time and reduced position hysterysis for said actuator during single track seeks, and
said second set of pulses is selected to provide reduced mid-frequency resonance, reduced settling time, and reduced position hysterysis for said actuator during multi-track seeks.

10. The improvement of claim 9 wherein
said first set of pulses is a single, finite length burst of width modulated, drive voltage pulses for the selected phases of said motor, and
said second set of pulses comprises first and second finite length bursts of width modulated, drive voltage pulses for the selected phases of said motor; said first burst of pulses being selected to control the acceleration profile of said actuator, and said second burst of pulses being selected to control the deceleration profile of said actuator.

11. The improvement of claim 10 wherein
said first burst of pulses and said second burst of pulses are applied to the selected phases of said motor during a first few steps and a final few steps, respectively, of multi-track seeks exceeding a predetermined number of tracks.

* * * * *